(12) United States Patent
Zhuang et al.

(10) Patent No.: US 10,263,299 B2
(45) Date of Patent: Apr. 16, 2019

(54) ELECTRICAL SYSTEM WITH REPLACEABLE BATTERIES

(71) Applicant: CHANGZHOU GLOBE CO., LTD., Changzhou, Jiangsu (CN)

(72) Inventors: Xian Zhuang, Jiangsu (CN); Yin Chen, Jiangsu (CN); Yi Liu, Jiangsu (CN); Lei Feng, Jiangsu (CN); Wenming Zhang, Jiangsu (CN)

(73) Assignee: CHANGZHOU GLOBE CO., LTD., Changzhou (CN)

( * ) Notice: Subject to any disclaimer, the term of this patent is extended or adjusted under 35 U.S.C. 154(b) by 126 days.

(21) Appl. No.: 15/404,218

(22) Filed: Jan. 12, 2017

(65) Prior Publication Data
US 2017/0125852 A1    May 4, 2017

Related U.S. Application Data

(63) Continuation of application No. PCT/CN2015/076222, filed on Apr. 10, 2015.

(30) Foreign Application Priority Data

Jul. 15, 2014    (CN) .......................... 2014 1 0333465

(51) Int. Cl.
*H02J 7/00* (2006.01)
*H02J 7/14* (2006.01)
(Continued)

(52) U.S. Cl.
CPC ....... *H01M 10/441* (2013.01); *H01M 2/1077* (2013.01); *H01M 10/42* (2013.01);
(Continued)

(58) Field of Classification Search
USPC ........ 320/112, 116, 134, 103, 118, 126, 130, 320/152, 161
See application file for complete search history.

(56) References Cited

U.S. PATENT DOCUMENTS

| | | | | | |
|---|---|---|---|---|---|
| 5,539,297 | A | * | 7/1996 | Fiebig | ................. H02J 7/0024 320/126 |
| 2003/0044689 | A1 | * | 3/2003 | Miyazaki | .............. B60L 11/185 429/320 |
| 2004/0257042 | A1 | * | 12/2004 | Liu | ..................... H01M 10/441 320/130 |

(Continued)

FOREIGN PATENT DOCUMENTS

| | | |
|---|---|---|
| CN | 1988312 A | 6/2007 |
| CN | 101667737 A | 3/2010 |

(Continued)

OTHER PUBLICATIONS

International Search Report of PCT Patent Application No. PCT/CN2015/076222 dated Jul. 8, 2015.

(Continued)

*Primary Examiner* — Alexis B Pacheco

(57) ABSTRACT

An electrical system with replaceable batteries comprises an electrical system and a combined switch. The electrical system comprises a plurality of battery packs (1, 2, 3); all the battery packs are independently arranged each other; and an electric-quantity display device which is used for displaying the electric-quantity information indicating signals of the battery packs and a gear switch which is used for mutually switching the battery packs are arranged on the combined switch. Each battery pack comprises a battery ($A_1$, $A_2$, $A_3$), a power switches ($B_1$, $B_2$, $B_3$) and a battery management system ($C_1$, $C_2$, $C_3$). The battery management systems receive and combine the output signals of the combined switches with the electric-quantity information indicating signals, thereby controlling whether the power switches are closed to provide power output or not.

9 Claims, 1 Drawing Sheet

(51) Int. Cl.
  *H01M 10/44*    (2006.01)
  *H01M 10/42*    (2006.01)
  *H01M 2/10*     (2006.01)
  *H01M 10/48*    (2006.01)

(52) U.S. Cl.
  CPC ............. *H01M 10/488* (2013.01); *H02J 7/00* (2013.01); *H02J 7/0026* (2013.01); *H01M 2010/4271* (2013.01)

(56) References Cited

U.S. PATENT DOCUMENTS

| | | | | |
|---|---|---|---|---|
| 2007/0236173 A1* | 10/2007 | Kimura | ................. | H01M 10/42 320/112 |
| 2008/0012570 A1* | 1/2008 | Bucur | ................ | H01M 8/04552 324/426 |
| 2008/0180106 A1* | 7/2008 | Gorbold | ............ | G01R 31/3658 324/434 |
| 2011/0089900 A1* | 4/2011 | Hogari | ................ | H01M 10/441 320/118 |
| 2012/0074894 A1* | 3/2012 | Chen | .................... | B60L 11/005 320/103 |
| 2012/0175953 A1* | 7/2012 | Ohkawa | ................ | B60L 3/0046 307/18 |
| 2013/0069594 A1* | 3/2013 | Jung | ................... | H01M 10/425 320/112 |

FOREIGN PATENT DOCUMENTS

| | | | |
|---|---|---|---|
| CN | 102307260 A | | 1/2012 |
| CN | 202197340 U | | 4/2012 |
| CN | 102447301 A | | 5/2012 |

OTHER PUBLICATIONS

1st Office Action of counterpart Chinese Patent Application No. 201410333465.9 dated Dec. 28, 2015.

* cited by examiner

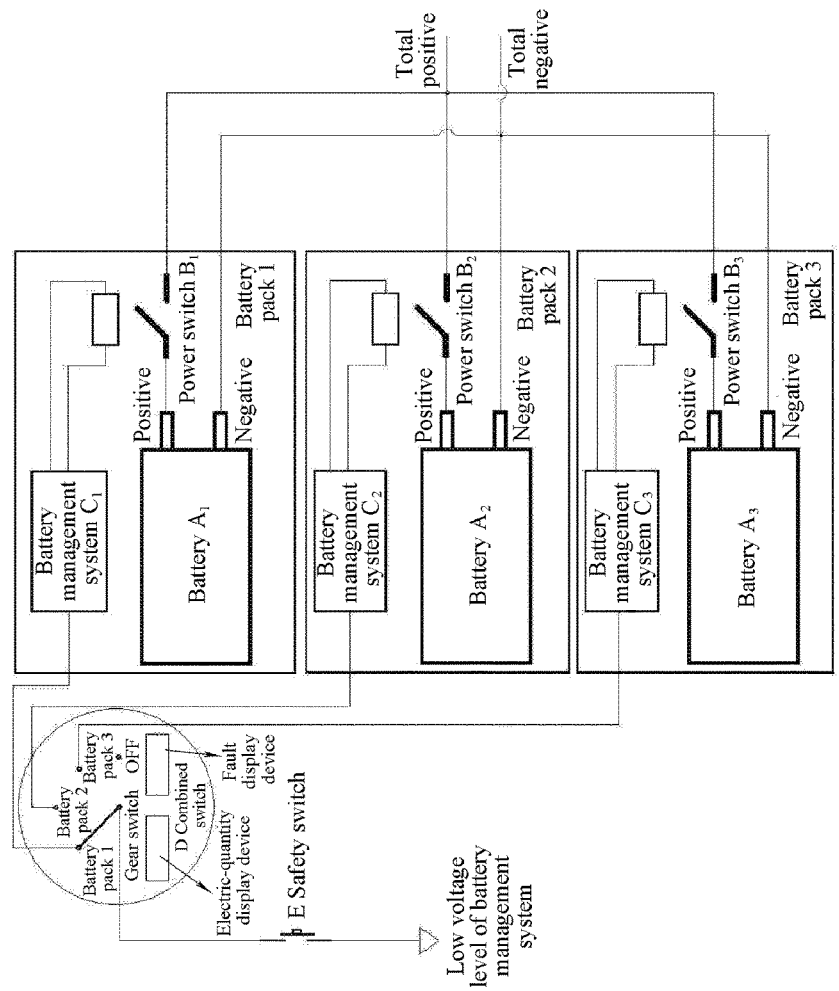

ELECTRICAL SYSTEM WITH REPLACEABLE BATTERIES

CROSS REFERENCE TO RELATED APPLICATIONS

This application is a continuation application of PCT application No. PCT/CN2015/076222 filed on Apr. 10, 2015, which claims priority to Chinese patent application No. 201410333465.9 filed on Jul. 15, 2014, the entire contents of which are incorporated herein by reference.

BACKGROUND

Technical Field

The present invention relates to a battery system, and in particular, to an electrical system with replaceable batteries.

Related Art

Batteries for common electrical devices are generally classified into two types:

1. non-removable batteries, for example, some cell phone batteries; and
2. removable batteries, for example, a quick-replaceable battery for an all-electric vehicle or an all-electric bus that requires a dedicated battery-replacing station to provide a dedicated tool for battery replacement.

Moreover, generally, a device with a battery, especially a device with a large-capacity battery, necessarily has a problem that the battery is excessively large and excessively heavy. Batteries of many large devices, such as all-electric vehicles, all-electric buses, large hybrid power systems, and large energy storage systems, may be designed to be non-removable, or be designed to be mechanically removable by a dedicated removing tool.

Such design greatly hinders people's usage.

SUMMARY

A technical problem that the present invention mainly resolves is to provide an electrical system with replaceable batteries, where the electrical system is constructed by a plurality of independent small batteries instead of a single large battery, and the total capacity of the batteries is changed by increasing or decreasing the number of the installed independent small batteries, thereby balancing the endurance time and device weight in a most economical manner.

To resolve the foregoing technical problem, one technical solution adopted by the present invention is: an electrical system with replaceable batteries is provided, including: an electrical system and a combined switch, where the electrical system includes a plurality of battery packs, the battery packs are independently arranged, an electric-quantity display device used for displaying an electric-quantity information indicating signal of each of the plurality of battery packs and a gear switch used for switching among the plurality of battery packs are arranged on the combined switch.

Each battery pack includes a battery, a power switch, and a battery management system, and each battery management system receives an output signal of the combined switch, and combines the output signal with the electric-quantity information-indicating signal, thereby controlling whether to close the corresponding power switch to provide power output.

In a preferred embodiment of the present invention, the electrical system with replaceable batteries further includes a safety switch, the combined switch and the safety switch are connected to form a loop, and a low voltage level signal of the battery management system is outputted by means of the combined switch in the loop.

In a preferred embodiment of the present invention, the electrical system further includes a case, and the battery packs are located in the case.

In a preferred embodiment of the present invention, the case further includes a case cover or a safety device thereon, and the case cover or the safety device is in control connection with the safety switch.

In a preferred embodiment of the present invention, the electrical system with replaceable batteries further includes a fault display device used for displaying a battery pack fault state.

In a preferred embodiment of the present invention, the fault display device is an indicating lamp.

In a preferred embodiment of the present invention, the battery packs are lead-acid battery packs, lithium battery packs or nickel-metal hydride battery packs.

In a preferred embodiment of the present invention, the power switches are electronic switches.

In a preferred embodiment of the present invention, the electronic switches are relays or contactors.

Beneficial effects of the present invention are: an electrical system is constructed by using a plurality of independent small batteries instead of a single large battery, and each battery pack is provided with a battery, a power switch, and a battery management system, thereby effectively determining, by means of control of a power switch, whether to close the power switch, and providing power output.

BRIEF DESCRIPTION OF THE DRAWINGS

To describe the technical solutions of the embodiments of the present invention more clearly, the following briefly introduces the accompanying drawings required for describing the embodiments. Apparently, the accompanying drawings in the following description show only some embodiments of the present invention, and a person of ordinary skill in the art may still derive other drawings from these accompanying drawings without creative efforts, and wherein:

The FIGURE is a structural diagram of a system of a preferred embodiment of an electrical system with replaceable batteries according to the present invention.

DETAILED DESCRIPTION

The following clearly and completely describes the technical solutions in the embodiments of the present invention. Apparently, the described embodiments are some of the embodiments of the present invention rather than all of the embodiments. All other embodiments obtained by a person of ordinary skill in the art based on the embodiments of the present invention without creative efforts shall fall within the protection scope of the present invention.

An embodiment provided in the present invention includes:

an electrical system with replaceable batteries, which is applied to an electric tool, an electric vehicle, an electric tricycle, or another scenario in which a battery is used, and includes: an electrical system and a D combined switch. The electrical system includes a plurality of battery packs, and the battery packs are independently arranged.

An electric-quantity display device used for displaying electric-quantity information indicating signals of the battery packs and a gear switch used for switching among the battery packs are arranged on the D combined switch.

Each battery pack includes a battery, a power switch, and a battery management system. Each of the battery management systems receives an output signal of the D combined switch, and combines the output signal with an electric-quantity information-indicating signal, thereby controlling whether to close the corresponding power switch to provide power output.

Preferably, the battery packs are lead-acid battery packs, lithium battery packs, or nickel-metal hydride battery packs, and the batteries are lead-acid batteries, lithium batteries, or nickel-metal hydride batteries.

Preferably, the power switches are electronic switches, and the electronic switches are relays or contactors.

The electrical system with replaceable batteries further includes an E safety switch, the D combined switch and the E safety switch are connected to form a loop, and a low voltage level signal of the battery management system is outputted by means of the combined switch in the loop.

The electrical system further includes a case, and the battery packs are located in the case. The case further includes a case cover or a safety device thereon, and the case cover or the safety device is in control connection with the E safety switch.

The electrical system with replaceable batteries further includes a fault display device used for displaying a battery pack fault state, and the fault display device is preferably an indicating lamp.

Referring to the FIGURE, the present invention further provides a specific implementation manner, which is further described by using three battery packs as an example.

An electrical system with replaceable batteries includes: an electrical system and a D combined switch, and the electrical system includes a plurality of battery packs. Preferably, there are three battery packs, which are a battery pack 1, a battery pack 2, and a battery pack 3 separately, and the battery pack 1, the battery pack 2, and the battery pack 3 are independently arranged.

The D combined switch, a mechanical or an electronic switch adapted to switch a working battery, includes several gears, and is used for switching to any gear, thereby electrically connecting a common terminal and a wiring terminal of a current gear, and disconnecting wiring terminals of other gears from the common terminal.

The battery pack 1, the battery pack 2, and the battery pack 3 may be applied to many types of devices.

An electric-quantity display device used for displaying electric-quantity information indicating signals of the battery packs and a gear switch used for switching among the battery packs are arranged on the D combined switch. The gear switch is provided with a plurality of gears, and preferably four gears in this embodiment, which are a battery pack 1 gear, a battery pack 2 gear, a battery pack 3 gear, and an OFF gear separately, the OFF gear being an off gear.

The number of gears changes with the number of battery packs.

Each battery pack includes a battery, a power switch, and a battery management system. Each of the battery management systems receives an output signal of the combined switch, and combines the output signal with an electric-quantity information-indicating signal, thereby controlling whether to close the corresponding power switch to provide power output.

One battery, one power switch, and one battery management system, that is, three components, form a battery pack, which may be packaged into an independent structure, or be electrically connected by means of a plurality of modules to form a combined system. A plurality of battery packs forms an electrical system.

The battery pack 1 includes a battery A1, a power switch B1, and a battery management system C1.

The battery pack 2 includes a battery A2, a power switch B2, and a battery management system C2.

The battery pack 3 includes a battery A3, a power switch B3, and a battery management system C3.

The battery A1, the battery A2, and the battery A3 may be lead-acid batteries, lithium batteries, nickel-metal hydride batteries, and the like, and structures thereof are not limited.

The power switches may be electronic switches such as relays and contactors.

Each of the battery management systems manages one battery pack. The battery management system has to have functions of receiving a switch signal of the D combined switch, and controlling, according to the switch signal and a battery state, a corresponding power switch to be opened or closed.

Preferably, the electrical system with replaceable batteries further includes an E safety switch, the D combined switch and the E safety switch are connected to form a loop, and a low voltage level signal of the battery management system is outputted by means of the combined switch in the loop.

The battery management system in each battery pack obtains a low voltage level signal of the battery management system by means of the loop formed by connecting the D combined switch and the E safety switch, and the battery management system determines, according to an electric-quantity state in the current electric-quantity display apparatus, whether to close a power switch to provide power output.

The electrical system with replaceable batteries further includes a fault display device used for displaying a battery pack fault state, the fault display device is preferably an indicating lamp, and the indicating lamp displays a battery pack fault state by means of a color or by flashing.

The electrical system further includes a case, and the battery packs are located in the case. The case further includes a case cover or a safety device thereon, and the case cover or the safety device is in control connection with the safety switch. When the case cover is opened or the safety device is released, the safety switch is disconnected, and when the case cover is closed or the safety device is on, the safety switch is closed.

Alternatively, in another control logic, when the case cover is opened or the safety device is released, the safety switch is closed, and when the case cover is closed or the safety device is on, the safety switch is disconnected.

In the FIGURE, when the case cover is opened or the safety device is released, the E safety switch is disconnected, and when the case cover is closed or the safety device is on, the safety switch is closed.

In operation, after the battery pack 1, the battery pack 2, and the battery pack 3 are installed, and the case cover is closed or the safety device is on, the E safety switch is closed with the case cover or the safety device.

When a switch of the entire system is on, the battery management systems of the battery pack 1, the battery pack 2, and the battery pack 3 work by using an external or internal power source. The internal power source is the battery A1, the battery A2, and the battery A3, and the external power source is another external power source that can provide power.

At this time, a background indication signal of the battery pack 1, the battery pack 2, or the battery pack 3 or a display device such as a relevant indication panel on the D combined switch displays electric-quantity information of the corresponding battery pack.

If a battery indication signal is null, it indicates that the corresponding battery is not installed.

The gear of the D combined switch is switched from OFF to the battery pack 3, and therefore, the battery management system C3 of the battery pack 3 obtains a low voltage level signal of the battery management system by means of the loop formed by connecting the D combined switch and the E safety switch. At this time, the battery management system C3 determines, according to a current battery state, whether to close the B3 power switch to enable the battery pack 3 to provide power output.

A fault state of a battery pack is provided in a form of sound or optical information to an operator by means of a fault display device. If the fault display device is an indicating lamp, when the indicating lamp is red or flashes, the D combined switch selects a gear, to cause the battery management system of the faulty battery pack not to close the B power switch to provide power output.

The display device is located on an interface of the D combined switch, or is controlled by another independent interface to perform display.

When the electric-quantity indicating signal of the battery pack 3 indicates low electric-quantity, the operator switches the gear of the D combined switch to the battery pack 2. At this time, the battery management system C3 of the battery pack 3 loses a low voltage level of the battery management system that is inputted by the D combined switch, and the B3 power switch is disconnected first. Subsequently, the battery pack 2 obtains a low voltage level of the battery management system by means of the loop formed by the D combined switch and the E safety switch. At this time, if the battery management system C2 of the battery pack 2 determines that the battery pack 2 is in a normal state, the battery management system C2 of the battery pack 2 controls the B2 power switch of the battery pack 2 to be closed to provide power output, thereby switching from the battery pack 3 to the battery pack 2.

If all the batteries or several batteries are of low electric quantities, the corresponding batteries may be replaced.

Preferably, each battery is designed to have weight that is suitable for manpower or simple tools to handle and remove the battery, and to have a simple connection interface.

Generally, the D combined switch needs to be switched to the OFF gear to disconnect all the power output, so that the batteries can be removed and replaced. To prevent a misoperation of a user, when the user replaces or removes the battery packs while the system is energized, the associated E safety switch is disconnected when the case cover or the mechanical safety device is opened, thereby ensuring that the power output is disconnected when the user touches the battery packs.

Beneficial effects of the electrical system with replaceable batteries according to the present invention are:

1. an electrical system with replaceable batteries is provided, where the electrical system is constructed by using a plurality of independent small batteries instead of a single large battery, thereby reducing the size and weight of the batteries, enabling a user to handle and replace the batteries by using manpower or simple tools, improving the battery replacement efficiency, and implementing battery commonality; and 2. the total capacity of the batteries is changed by increasing or decreasing the number of the installed independent small batteries, thereby matching an endurance time in a most economical manner, increasing or decreasing the number of battery packs according to an expected usage plan, and reducing unnecessary device weight.

The foregoing descriptions are merely embodiments of the present invention but are not intended to limit the patent scope of the present invention. Any equivalent modifications made to the structures or processes based on the content of the specification of the present invention for direct or indirect use in other relevant technical fields shall also be encompassed in the patent protection scope of the present invention.

What is claimed is:

1. An electrical system with replaceable batteries, comprising:
   an electrical system comprising a plurality of battery packs, wherein the plurality of battery packs are independently arranged, and wherein each battery pack comprises a battery, a power switch, and a battery management system; and
   a combined switch including
   an electric-quantity display device used for displaying an electric-quantity information indicating signal of each of the plurality of battery packs and
   a gear switch used for switching among the plurality of battery packs, wherein the gear switch having multiple gear positions corresponding to the plurality of battery pack and an off gear position;
   wherein each battery management system receives an output signal of the combined switch when corresponding gear position of the gear switch is closed and combines the output signal with the electric-quantity information-indicating signal, thereby controlling whether to close the corresponding power switch to provide power output.

2. The electrical system with replaceable batteries according to claim 1, further comprising a safety switch, the combined switch and the safety switch are connected to form a loop, and a low voltage level signal of the battery management system is outputted by means of the combined switch in the loop.

3. The electrical system with replaceable batteries according to claim 2, wherein the electrical system further comprises a case, and the battery packs are located in the case.

4. The electrical system with replaceable batteries according to claim 3, wherein the case further comprises a case cover or a safety device thereon, and the case cover or the safety device is in control connection with the safety switch.

5. The electrical system with replaceable batteries according to claim 1, further comprising a fault display device used for displaying a battery pack fault state.

6. The electrical system with replaceable batteries according to claim 5, wherein the fault display device is an indicating lamp.

7. The electrical system with replaceable batteries according to claim 1, wherein the battery packs are lead-acid battery packs, lithium battery packs or nickel-metal hydride battery packs.

8. The electrical system with replaceable batteries according to claim 1, wherein the power switches are electronic switches.

9. The electrical system with replaceable batteries according to claim 8, wherein the electronic switches are relays or contactors.

\* \* \* \* \*